Nov. 11, 1958     F. A. TRACK     2,859,711
FLUID SUSPENSION FOR A LOAD CARRYING BODY
Filed May 15, 1956     3 Sheets-Sheet 1
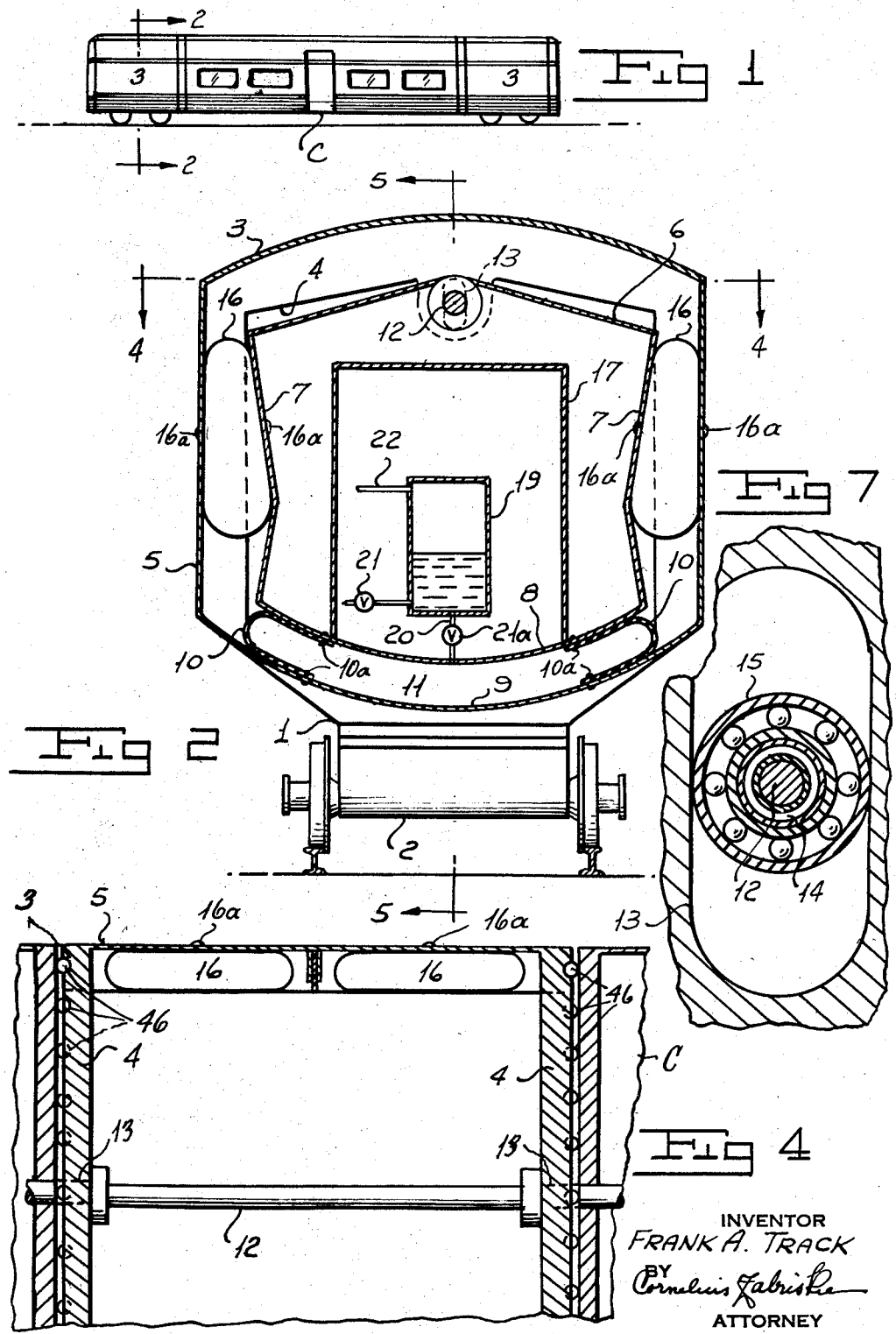
INVENTOR
FRANK A. TRACK
BY
Cornelius Zabriskie
ATTORNEY

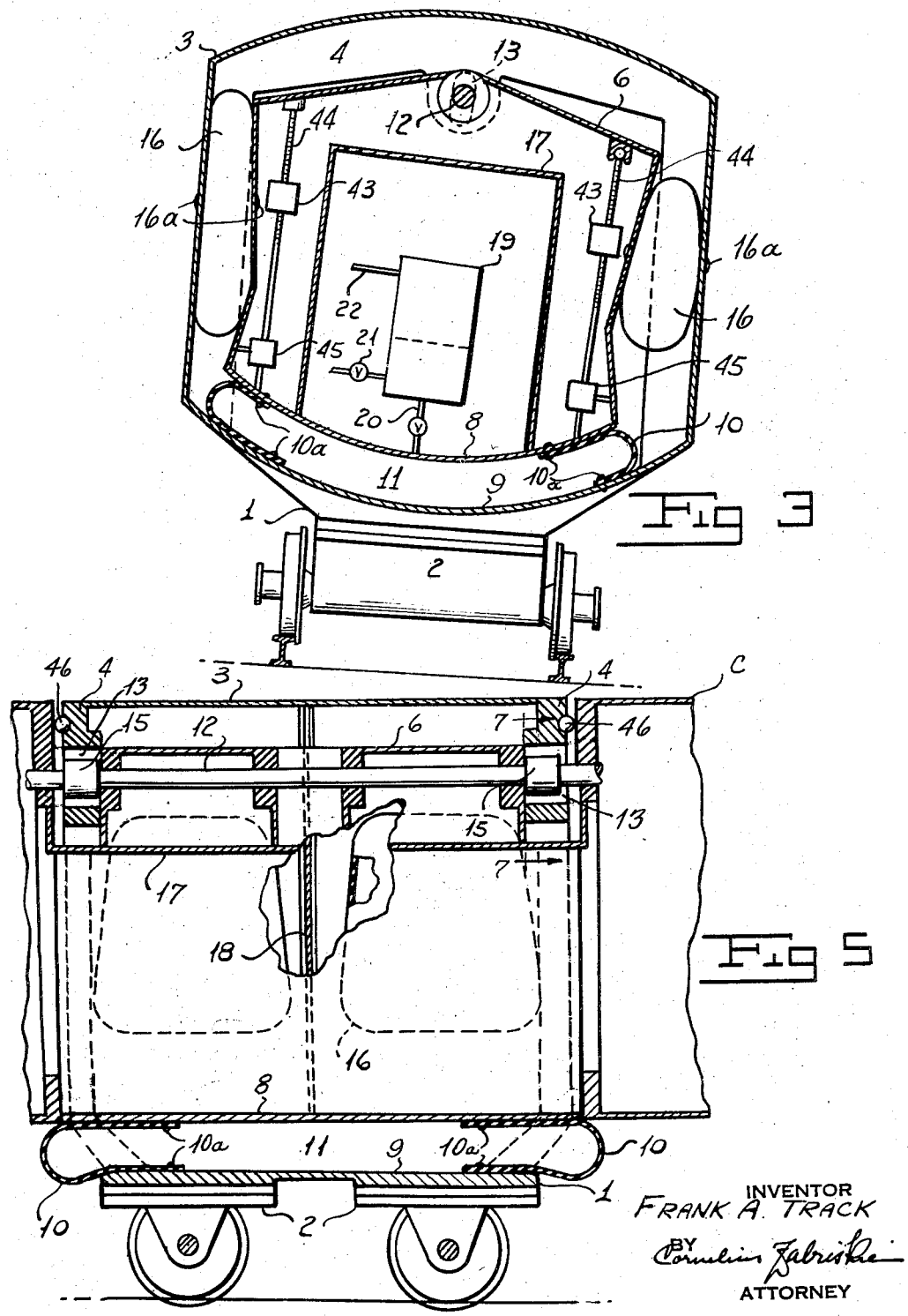

Nov. 11, 1958 F. A. TRACK 2,859,711
FLUID SUSPENSION FOR A LOAD CARRYING BODY
Filed May 15, 1956 3 Sheets-Sheet 3
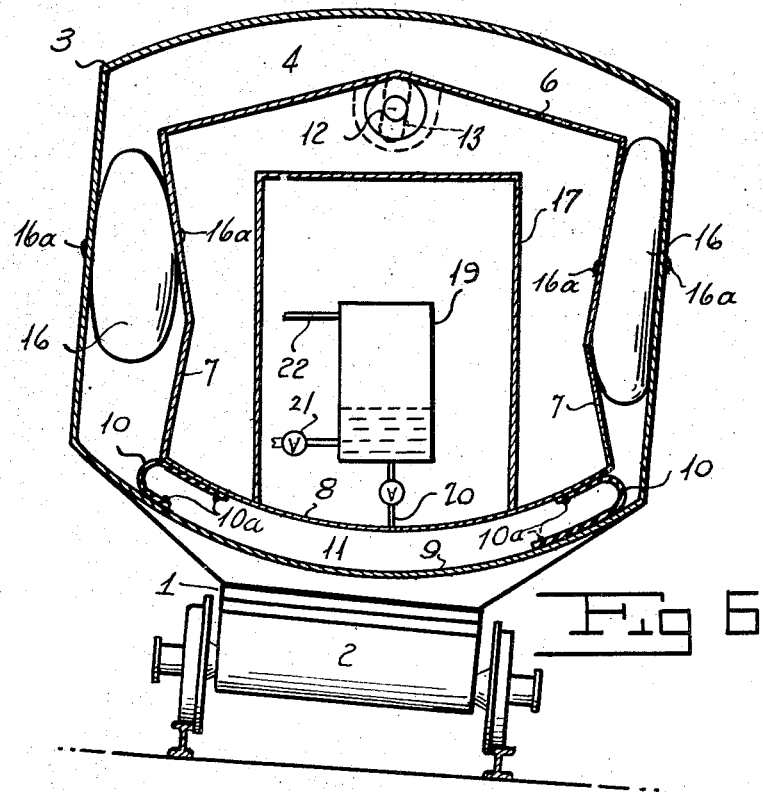
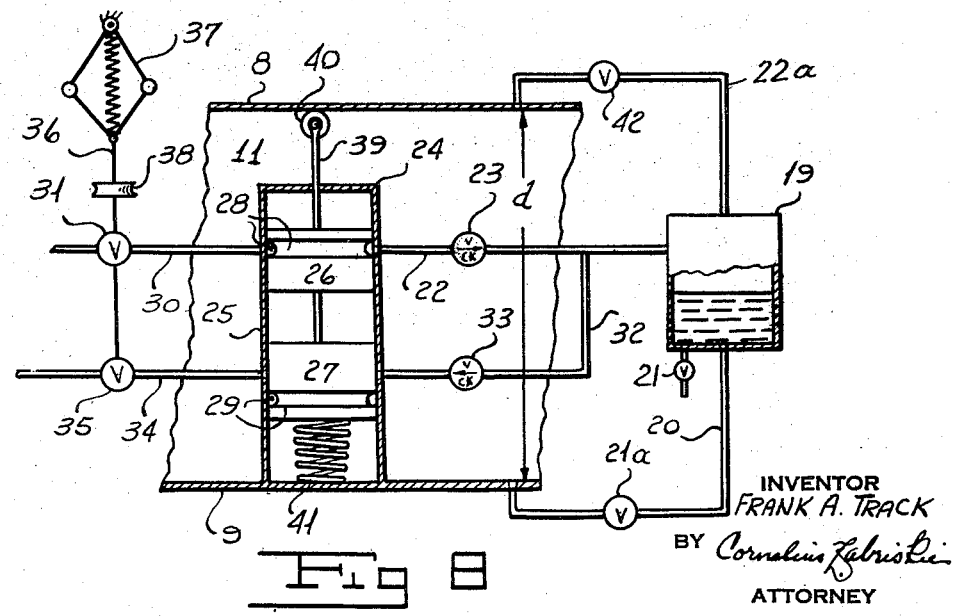
INVENTOR
FRANK A. TRACK
BY
ATTORNEY United States Patent Office 2,859,711
Patented Nov. 11, 1958

2,859,711

FLUID SUSPENSION FOR A LOAD CARRYING BODY

Frank A. Track, Stamford, Conn.

Application May 15, 1956, Serial No. 584,974

26 Claims. (Cl. 105—453)

This invention is a fluid suspension for a load carrying body and, while adapted for general uses, it is primarily conceived for the suspension of the load carrying bodies of wheeled vehicles and more particularly railway rolling stock of either the passenger or freight type. It preferably utilizes the combination of both hydraulic and pneumatic functions in the support of a load carrying body in such manner as to minimize the transmission of road shocks to the body, and also to minimize and cushion lateral sway of such body.

Generally speaking, the present invention contemplates the support of said body upon a buoyancy chamber containing a supporting fluid medium which may be either gaseous or liquid. In either case, this fluid functions to support the weight of the body and the load contained therein, but said fluid is in communication at all times with a pneumatic pressure head which may be adjusted, preferably in an automatic manner, in accordance with the load.

In its preferred practical form, the invention comprises an appropriate supporting base which may be wheeled or otherwise and upon this base is superimposed a relatively rigid housing within the confines of which is housed at least a portion of a load carrying body. Between the floor of that body and the floor of the housing is a buoyancy chamber having a flexible peripheral wall secured to both the floor of the housing and the floor of the load carrying body to provide within said wall, above the floor of the housing and below the floor of the load carrying member, a substantially closed chamber in which the supporting fluid is contained for the purpose of supporting the body and the weight imposed thereon against the force of gravity. The upper portion of the load carrying body has a pivotal connection with the housing which serves to space the upper portion of such body relative to and within the housing and this pivotal connection, together with the flexible wall of the buoyancy chamber, permits a limited transverse pivotal movement of the body relative to the housing. This pivotal mounting is such as to also permit raising and lowering movement of the body within its housing, while flexible cushions interposed between the lateral sides of the body and the housing, cushion and restrain such transverse pivotal movement of the body against sudden shocks in a lateral direction.

In combination with the structure as thus far described I preferably employ a separate surge chamber and so connect the surge and buoyancy chambers as to permit the automatic adjustment of the suspension to different loading of the load carrying body, as hereinafter more fully explained.

This invention embodies many novel features, among which may be enumerated the following:

The body under conditions, such as a straight road with no camber or bank, will maintain a vertical position of the body, will maintain an almost constant height above the roadbed, will reduce vertical oscillation to a minimum, will maintain a spring resilience compatible with any and all loadings.

Should the body be displaced laterally with respect to the running gear, the tendency to stabilize itself is immediately effective and the two will again assume their proper normal relationships.

Should the vehicle be on a cambered or banked road, and either at rest or running freely on a straight road, the loaded body will tend to assume a vertical position with respect to the horizon.

Should the body be displaced by virtue of centrifugal action when rounding a curve on a banked road, the body will tend to lean inward, in contradiction to the conventional vehicles.

The loading level when the vehicle is at a loading platform will automatically be at the height of that platform.

It supports the load by air pressure.

It gives springiness and required resilience.

It automatically adjusts the air pressure to carry the load at the prescribed and desired height from the roadbed under all changes of loading when at rest only.

The required resilience may be adjusted to any degree of resilience by changing the amount of water in the surge chamber.

Features of the invention, other than those adverted to, will be apparent from the hereinafter detailed description and appended claims, when read in conjunction with the accompanying drawings.

The accompanying drawings illustrate one practical embodiment of the invention, but the construction therein shown is to be understood as illustrative, only, and not as defining the limits of the invention.

Fig. 1 is a side elevation of a railway car embodying the present invention.

Fig. 2 is a section on the line 2—2 of Fig. 1 showing the parts in the condition which they occupy when the car is supported on a level track.

Fig. 3 is a view similar to Fig. 2, but showing the relation of the parts while the car is in motion on a banked curve.

Fig. 4 is a section on the line 4—4 of Fig. 2.

Fig. 5 is a section on the line 5—5 of Fig. 2.

Fig. 6 is a view corresponding to Figs. 2 and 3, but shows the relative position of the parts when the car is either at rest or moving along a straight track which is not level.

Fig. 7 is a fragmental section on the line 7—7 of Fig. 5.

Fig. 8 is a diagrammatic view showing one form of automatic control to maintain an optimum spacing between the load carrying surface and the bottom surface of the buoyancy chamber.

This invention may be employed wherever a load carrying body is to be supported in a manner to protect it against undesirable shock or vibration. It may be utilized in trucks, trailers and other vehicles of either single or tandem axle types. However, for the purpose of concrete disclosure, I have shown the invention in the accompanying drawings as associated with a railway car. Here the supporting base 1 is provided with a wheeled truck 2 in such manner as to permit pivotal movement of the wheeled truck on a vertical axis with respect to the supporting base 1, as by the use of conventional fifth wheel and king pin construction. The base 1 may be of any desired shape and size depending upon the load carrying body to be supported therefrom and upon the particular environment in which the invention is employed and may be provided with a single axle and associated wheels or with multiple axles as shown in Fig. 5.

Upon the base and rigidly supported thereon is a housing 3 which also may be of any desired shape. It may be skeletonized or it may be in the form of an appropriate frame or frames. As shown in the drawings, it comprises two spaced apart end frames 4 having a sheathing at 5 to form an enclosure.

Within the housing 1 is positioned the whole or a part of a load carrying body designated generally by the reference character 6. It may be wholly enclosed within the housing or, as in the construction shown, the load carrying body 6 may constitute one end portion of a railway car, indicated at C. This matter will depend upon the environment in which the invention is used. In any event the load carrying body 6 has side walls 7 and a bottom wall or floor 8 of transverse arcuate form as shown in Figs. 2, 3 and 6.

The floor 9 of the housing is also preferably of the arcuate form shown and may be curved on the same radius as the floor 8 of the load carrying body. Between the floors 8 and 9 is interposed a peripheral wall 10 of flexible material. This wall extends entirely around four sides of the floor of the load carrying body 6 with the upper and lower portions of said wall respectively secured to the body and housing in such manner as to form with these parts hermetic seals. The wall 10 is looped as shown in Fig. 2 and it is secured at its margins to the respective parts to permit flexure with accompanying vertical or lateral movement of the load carrying body with respect to the housing, as hereinafter described. Wall 10 may conveniently be formed of fabric impregnated with rubber or other appropriate material to render it impervious to the leakage of fluid, so that this wall 10, together with the floors 8 and 9 of the body and housing, collectively enclose a space 11, which I will hereinafter term a buoyancy chamber. Fluid contained in this chamber 11 is adapted to support the weight of the body 6 and the load imposed thereon against the force of gravity.

Extending longitudinally through and secured to the upper portion of the body and preferably quite close to its top is a trunnion shaft 12, the opposite ends of which form trunnions which project through vertical slots 13 formed in the end frames 4 of the housing for the purpose of laterally locating and guiding the upper portion of the load carrying body with respect to the confines of the housing. I prefer to associate these trunnions with the slots 13 in the manner shown in Fig. 7. Here each of the opposite ends of the shaft 12 is shown as fitted into a hollow ring 14, the interior of which is subjected to pneumatic pressure and this ring is in turn seated within an anti-friction bearing 15, the periphery of which is adapted to ride in the corresponding slot 13, so as to guide the load carrying body for vertical movement while cushioning said body against lateral shocks.

It will be noted from Fig. 2 that the floor 8 of the load carrying body, as well as the floor 9 of the housing, are of transverse arcuate form. Consequently these two floors 8 and 9 are, in effect, cylindrical in form. The floor 8 is in practice preferably curved on a radius, the center of which is the axis of the trunnion shaft 12, so that said floor is coaxial with said shaft. The floor 9 may be curved on the same radius, and, in practice, preferably is, although this curvature of both floors may be otherwise without departing from this invention. In any event, the trunnion shaft 12 is placed at or adjacent the top of the load carrying body and at a point above the center of weight of said body.

By mounting the body within the housing in the manner described, it is supported therein for oscillatory movement on the trunnions at the ends of the shaft 12 so that, when the cylindrical surface of the floor 8 is as described, the center of buoyant effort is at all times concentrated at the axis of said shaft. The pivotal movement of the body is cushioned and restricted by means of pneumatic cushions 16 interposed between the opposite side walls of the load carrying body and the corresponding side walls of the housing. Under ordinary conditions, these cushions are under balanced pressures and maintain the load carrying body in the plumb condition shown in Fig. 2, assuming of course that the supporting base 1 is horizontal. The opposite walls of the pneumatic cushions 16 are centrally fastened at 16a to the contiguous walls of the body and housing so as to permit a rolling and unrolling action thereof when there is relative pivotal movement between the body 6 and the base 1. The movement of one of the side walls 7 of the body toward the corresponding wall 5 of the housing compresses the cushion 16 on that side and increases the area of surface contact between it and the housing, while setting up increased pressure within the cushion resulting in a flattening effect upon the same. This increased pressure prevents undue lateral movement of the body 6 in this direction and consequent undesirable relative displacement of the body in that direction. While said cushion is being compressed, the cushion at the other side is expanding or, in effect, unrolling, so as to decrease its contact with the parts to which it is affixed and setting up, with the opposite cushion, differential pressures which tend to restore the load carrying body to its normal centralized position within the housing.

The entire interior of the load carrying body may be employed as a passenger or cargo space, although as shown in the drawings an interior enclosure indicated at 17 may be built in and floored over with horizontal flooring.

Relative longitudinal movement between the load carrying body and its housing is precluded by the incorporation of anti-friction thrust bearings illustrated at 46 in Figs. 4 and 5. These bearings are set into the opposite ends of the load carrying body 6 and act against opposing plane surfaces of the end frames 4 of the housing to permit pivotal and up and down movement of said body without undue friction.

The buoyancy chamber 11 may contain either a gaseous or liquid medium as a supporting fluid. In either event, the buoyancy chamber 11 is connected to a surge tank 19 which absorbs the impulses of an uneven roadbed. Where a gas, such as air, is used as a supporting medium, the chamber 11 is freely connected via pipe 22 to the upper portion of surge tank 19. The volume of gas within the surge tank is controlled by a quantity of liquid in the lower portion of the tank. The amount of liquid added to or subtracted from the surge tank, through a filling connection valved at 21, determines the resilience or springiness of the suspension, whether the supporting medium be either gas or liquid. The surge tank therefore has a dual purpose, one to absorb the surge impulses from the chamber 11, and, second, to adjust the springiness of the system by changing the gas volume within the surge chamber gas clearance space by the addition or subtraction of liquid in the lower portion of the tank 19. In the event a liquid is used as a supporting medium, the chamber 11 is connected via pipe 20 to the bottom of surge tank 19. Surge tank 19 is shown, for the purpose of illustration only, in the compartment 17. In practice, it will ordinarily be placed in a more accessible position. Under all conditions, whether chamber 11 is filled with gas or liquid, the pressure is controlled and maintained in the upper portion of the gas chamber 19. The preferred gas is air and the preferred liquid is water treated with an anti-freeze. The pressure of the air in the surge chamber is regulated in accordance with the load so as to maintain, under all conditions of loading, a substantially constant spacing between the floor of the load carrying body and the floor of the housing.

Fig. 8 shows means for accomplishing this result. A predetermined optimum distance, indicated $d$, should be maintained between the parts 8 and 9. Changes in loadings occur only at times when the vehicle is at rest. In the illustrative system of Fig. 8, a centrifugal governor, driven by a pulley 38 through a belt drive from some rotatable part of the car, when the car is in motion, e. g., an axle, controls two valves 31 and 35. These valves are closed when the car is in motion and opened by the governor when the car is at rest. Valve 31 controls the feed of compressed air from any suitable source on the car and valve 35 is an exhaust valve. A control device 24 is provided with an air admission valve 26 connected with the valve 31 and an exhaust valve 27 piped to valve 35. The two valves 26 and 27 have a common stem 39 fitted with a roller 40 held against the floor 8 by a spring 41. Pipe 22, having a check valve 23, leads from valve 26 to the upper air space of the surge tank 19, and a branch pipe 32, having a check valve 33, leads from pipe 22 to the exhaust valve 27. Another pipe 22a, valved at 42, leads from the upper part of the surge tank directly to the interior of the buoyancy chamber 11.

When the loading is such as to depress the load carrying body below the distance d, the valves 26 and 27 will be depressed to register a port 28 in valve 26 with pipes 30 and 22 and, if the car is at rest and the valve 31 consequently open, compressed air will be fed from the source to the surge tank until the pressure in the latter is sufficient to restore the spacing to the optimum value d. Conversely, if the loading is decreased, the valve 27 will be elevated to register a port 29 therein with the pipes 32 and 34 and permit escape of excess pressure through the branch pipe 32 to the atmosphere until the optimum spacing d is re-established.

So long as the load remains the same, or the train is in motion and the valves 31 and 35 consequently closed, the spacing d will remain constant, except for such vertical movement of the housing as may be occasioned by uneven surfaces of the track. As these uneven portions are encountered by the wheels, the fluid in the buoyancy chamber, acting against compressed air in the surge chamber, will cushion the transmission of the resulting shocks to the load carrying body and the spacing will return after each shock to the optimum value d.

It will of course be understood that a railway car equipped with this invention will be provided at each end with such a suspension with the draw-bars associated with the supporting base or housing. Between the suspensions at the opposite ends of the car, the remainder of that car may be conventional, either as a passenger car or a freight car. In any event, the movements of the body of the car, including the load carrying body portions thereof, will partake of very definite relations to the supporting base, trucks and housings, depending upon the character of the roadbed over which the car travels.

When the car is traveling along a straight horizontal track, the load carrying body portions of the car will each appear as in Fig. 2 with the load carrying body portions plumb within plumb housings. In the event that the car comes to a portion of the track which is not laterally level, the trucks, supporting bases and housings will tilt in conformity with the tilt of the track, but the load carrying body portions will remain plumb as shown in Fig. 6.

During the change from a level to a tilted portion of the track, the load supporting body portions will shift about the trunnions of the shaft 12 to maintain the plumb condition, but the right hand cushion 16 will cushion this movement so that it will not be abrupt or jerky, while the flexible wall 10 of the buoyancy chamber will shift or roll, one portion over the other as shown, to accommodate the changed relation. As soon as the car leaves the tilted portion of the track and returns to a horizontal portion thereof, the right hand cushion and the flexible walls 10 will assist in re-establishing the conditions shown in Fig. 2.

As the car enters a banked curve in the track, the trucks, supporting bases and the housings will tilt, as shown in Fig. 3, according to the tilt of the track due to banking on the curve. There will be a simultaneous tendency of the lower portions of the load carrying body portions to swing outwardly of the curve, but this movement will be cushioned by the left hand cushions 16, as shown in Fig. 3, and by the natural resistance of the flexible walls 11 of the buoyancy chambers, until these parts and centrifugal force come into a balanced relation in which the parts will remain until the curve has been passed, whereupon said parts will return to the normal upright position of Fig. 2.

There are times when it may be desirable to change the center of gravity of the receptacle body. Provision is made in Fig. 3 to this end. Here weights 43 are threaded to upright rods 44 adapted to be rotated by motors 45 or otherwise to raise and lower the weights and thus adjust the center of gravity of the car.

From the foregoing description, the following characteristic features of this invention appear, viz.:

The buoyancy chamber contains either gas or liquid as a buoyant medium, never both or a mixture of both.

The surge tank is partially filled with water to a degree that will give the required volume of gas in the upper part, i. e.; to give the required volume of "clearance." Varying this gas volume will give a different terminal compression pressure with an impulse from the buoyancy chamber. I change the clearance in the surge chamber by adding or subtracting water to arrive at a proper "give" or pressure resilience. This is independent of the actual pressure needed to sustain the load. A small clearance will arrive at a compression terminal pressure in less time than if the clearance were great. The object is to get a clearance volume that is the optimum—neither too small nor too large—so that the resilience is neither too stiff nor too limber. Once the required amount of water in the surge chamber is established for the vehicle and its normal loading, there need be no change. However, if the relationship between the load and the carrier is abnormal, there may be a reason for changing the amount of water (and the air clearance volume).

The load is the prime factor in determining the air pressure required on the system, once the upward buoyant effective area is decided upon. For support only, the live and dead load equals the effective buoyant area, multiplied by the pressure within the buoyancy chamber. The pressure is altered according to load by adding or subtracting air from the system but never by adding or subtracting water. Whether the buoyant medium is water or air, the pressure is obtained by air.

A space depth is required in the buoyancy chamber to permit the movement of the body with relation to the running gear in an up and down direction. This space depth is maintained under all conditions of loading. Therefore means is provided to maintain that depth when the loadings change and tend to lessen or increase the space depth. This is done automatically by adding or subtracting air from the system and cutting off the air supply or air discharge when the predetermined space depth is reached.

The center of curvature of the supporting load surface must be above the center of gravity of the load (vehicle-dead load and cargo live load) in order that there always be a righting moment. The center of curvature is preferably the center of an arc of a circle of the buoyant face and this is preferably the axis of transverse pivotal movement.

When the present invention is constituted as hereinbefore described, any lateral displacement of either the housing or the load carrying body relative to the other, creates a corrective righting lever which tends to restore a condition of equilibrium or stability wherein the center of buoyancy effort is directly below the center of gravity of the load.

In the embodiment of the invention chosen for illustrative purposes each load carrying body 6 is supported on a single buoyancy chamber. However, if desired a plurality of such chambers may be employed for this purpose without departing from the invention. The advantage of a multiple arrangement is that damage to any particular buoyancy chamber will leave the other buoyancy chambers operative to support the load carrying body. These several chambers may be all connected in multiple to a common surge tank with differential pressure valves interposed in each multiple connection to automatically cut out and isolate any particular damaged chamber, while leaving the remaining chambers operative to carry out the supporting functions hereinbefore described.

As hereinbefore pointed out, the walls 10 are of flexible material with their upper and lower margins secured at 10a to the floors 8 and 9, respectively, so that, when pivotal movement occurs between the body and its housing, these walls 10 will roll against the surfaces of said floors in one direction or the other depending upon the direction of relative rotation between the body and its housing.

In Fig. 6, the housing is shown canted clockwise and the body is shown with a movement anti-clockwise with an ultimate position vertical to the horizon. As the parts assume this condition, the wall 10 at the left rolls upon the floor 8 and unrolls from the floor 9, while the wall 10 at the right does just the opposite. As a result of this movement, the buoyant area of the floor 8 is retained, but the center of effort of the buoyant area is moved to the right until that buoyant effort is directly below the new position of the center of gravity of the load carrying body.

In Fig. 3, wherein the vehicle is shown on a curve and with a forward velocity, centrifugal action tends to move the center of gravity of the load carrying body clockwise to such degree wherein the outward centrifugal force, together with the force of the weight of the body, are neutralized by the buoyant action of the buoyancy chamber. Any movement of the body relative to the housing creates a righting lever and this lever remains so long as the center of buoyancy is at the right of the center of weight of the body. This continues until the forces are neutralized and the center of buoyancy and the resultant weight with its centrifugal component is one above the other.

The description of this invention has been largely on the application to railway cars. The invention is equally adaptable to other vehicles. For illustration, the description for railway cars is equally adaptable to single axle trailers.

It will thus be apparent from the foregoing description that the car is effectually cushioned against shocks, jars, and other forces exerted in both vertical and lateral directions and a comfortable ride is afforded to the occupants in passenger cars and freedom of damage to freight in freight cars.

The foregoing detailed description sets forth the invention in its preferred practical forms, but the invention is to be understood as fully commensurate with the appended claims.

Having thus fully described my invention, what I claim as new and desire to secure by Letters Patent is:

1. A fluid suspension for a vehicle comprising: a supporting base, a housing superimposed upon and rigid with said base, a load carrying body above the base, a buoyancy chamber interposed between the base and load carrying body for supporting and floating said load carrying body on the base, said buoyancy chamber having arcuate upper and lower walls and a flexible peripheral wall with the upper and lower margins of the flexible peripheral wall secured to said upper and lower walls of the buoyancy chamber and the intermediate portion of the flexible peripheral wall being looped outwardly to permit rolling coaction between the looped portion of said flexible wall and the arcuate walls of said buoyancy chamber and to also permit relative up and down movement between said arcuate walls, and means for guiding the upper portion of the load carrying body for up and down and swinging movement relative to the housing about an axis whose center is the center of curvature of the upper wall of the buoyancy chamber.

2. A fluid suspension according to claim 1, wherein said buoyancy chamber contains fluid under pressure.

3. A fluid suspension according to claim 2, wherein the fluid is gas.

4. A fluid suspension according to claim 2, wherein the fluid is a liquid.

5. A fluid suspension according to claim 2, comprising means controlled by the load on the load carrying body for regulating the pressure on the fluid in the buoyancy chamber.

6. A fluid suspension according to claim 1, comprising a surge chamber communicating with the buoyancy chamber, the lower portion of the surge chamber containing a liquid, and means for admitting a gas into the upper portion of said chamber under sufficient pressure to sustain the weight of the load carrying body and the load thereon.

7. A fluid suspension, according to claim 6, comprising means for automatically regulating the pressure of gas in the surge chamber in accordance with the load on the load carrying body.

8. A fluid suspension according to claim 1, comprising cushioning means positioned between the lateral walls of the load carrying body and the corresponding sides of the housing.

9. A fluid suspension according to claim 8, wherein said cushioning means are pneumatic cushions.

10. A fluid suspension according to claim 1, wherein the guiding means between the load carrying body and the housing comprises trunnions on one of them and upright slots on the other of them to permit raising and lowering movement of the load carrying body relative to its housing and relative rotational movement between them.

11. A fluid suspension according to claim 1, wherein the load carrying body is provided in its upper portion and at its opposite ends with trunnions acting within upright slots formed in the housing.

12. A fluid suspension according to claim 11, wherein the trunnions are fitted with anti-friction bearings operating within said slots.

13. A fluid suspension according to claim 12, wherein a pneumatic ring is interposed between each trunnion and the corresponding anti-friction bearing.

14. A fluid suspension according to claim 1, wherein the axis of swinging movement of the body relative to the housing is above the center of gravity of the body and its load.

15. A fluid suspension for a vehicle comprising: a supporting base, a housing superimposed upon and supported by said base and provided in its upper portion with upright slots spaced apart longitudinally of the vehicle, a load carrying body the upper portion of which is provided with coaxial trunnions extending into said slots to mount said body for up and down movement and for swinging movement in lateral directions, and a buoyancy chamber interposed between the load carrying body and the base to support said body against the force of gravity.

16. A fluid suspension according to claim 15, wherein the floor of the load carrying body forms the top wall of the buoyancy chamber and is transversely curved on a radius of which the axis of the trunnions is the center.

17. A fluid suspension according to claim 16, wherein the bottom wall of the buoyancy chamber is transversely curved on an arc of substantially the same radius.

18. A fluid suspension for a vehicle comprising: a supporting base, a load carrying body, a fluid containing buoyancy chamber interposed between the base and body to support and float the weight of the said body and the load thereon, a surge chamber adapted to contain a gas communicating with the interior of the buoyancy chamber, a pressure feed pipe leading from a source of gas under pressure to the surge chamber and including a movement controlled valve, an exhaust pipe leading from the surge chamber to the atmosphere and also including a movement controlled valve, means connected to said movement controlled valves for sealing them when the vehicle is in motion and unsealing them when the vehicle is at rest, and additional valvular means included in both pipes and controlled by vertical expansion and contraction of the buoyancy chamber to selectively permit the feed or exhaust of gaseous pressure to or from the surge chamber when the vertical dimension of the buoyancy chamber is respectively less or greater than a predetermined normal dimension.

19. A fluid suspension according to claim 18, wherein the movement controlled valves are controlled by a centrifugal governor operated from a movable part of the vehicle.

20. A fluid suspension according to claim 18, comprising means for admitting liquid to and withdrawing it from the surge chamber to regulate the volume of the space for gaseous pressure therein.

21. A fluid suspension according to claim 6, comprising means for admitting and withdrawing liquid from the surge chamber to regulate the volume of the space therein for gaseous pressure.

22. A fluid suspension comprising: a supporting base, a load carrying body above the base, a buoyancy chamber interposed between the base and body and containing fluid supporting the latter on the former while permitting relative lateral movement between the lower portion of the body and the base, and cooperating means on the base and on the upper portion of the body to confine said body to up and down movement and to transverse swinging movement on an axis included in a plane normal to the base and including the longitudinal medial line of the latter.

23. A fluid suspension for vehicles comprising: a supporting base, a load carrying body above the base, a pressurized fluid containing buoyancy chamber interposed between the base and the body and supporting the body on the chamber, said chamber having a transversely curvilinear upper surface and a lower surface, with a peripherally flexible fluid-tight seal at the edges of said chamber and said body being rotatable transversely about the center of buoyant effort of the fluid upon the upper surface of the buoyancy chamber, said flexible fluid-tight seal comprising peripheral walls the upper and lower margins of which are secured respectively to the upper and lower surfaces of the chamber with the portions of said walls adjacent said margins loosely engaging said upper and lower surfaces and the intermediate portion of the flexible walls bulging in an outward direction tangentially to said surfaces to permit of relative movement of the body with concurrent rolling and unrolling engagement of the flexible walls onto and from said surfaces exterior of the buoyancy chamber, in combination with a surge chamber connected to the buoyancy chamber, the lower portion of which surge chamber contains a liquid and the upper portion a gas under pressure.

24. A fluid suspension according to claim 23, comprising means for introducing gas under pressure into the upper part of the surge chamber from a source other than the buoyancy chamber, and means for introducing liquid into the surge chamber from a source other than the buoyancy chamber to vary the liquid level in the latter.

25. A fluid suspension according to claim 24, wherein the buoyancy chamber contains a liquid and is connected to the surge chamber below the liquid level in the latter.

26. A fluid suspension according to claim 24, wherein the buoyancy chamber contains gas under pressure and is connected to the surge chamber above the liquid level in the latter.

References Cited in the file of this patent

UNITED STATES PATENTS

| | | |
|---|---|---|
| 699,709 | Pulbrook | May 13, 1902 |
| 814,939 | Cerruti | May 13, 1906 |
| 1,675,957 | Reeves | July 3, 1928 |
| 1,860,241 | Galko | May 24, 1932 |
| 1,973,816 | Kruckenberg et al. | Sept. 18, 1934 |
| 2,081,996 | Hacker | June 1, 1937 |
| 2,093,486 | Schoepf et al. | Sept. 21, 1937 |
| 2,124,124 | Schoepf et al. | July 19, 1938 |
| 2,155,919 | Wooler et al. | Apr. 25, 1939 |
| 2,474,471 | Dolan | June 28, 1949 |
| 2,520,944 | Lynn et al. | Sept. 5, 1950 |
| 2,608,451 | Pierce | Aug. 26, 1952 |
| 2,721,616 | Rocha | Oct. 25, 1955 |

FOREIGN PATENTS

| | | |
|---|---|---|
| 528,356 | Great Britain | Oct. 28, 1940 |